United States Patent [19]

Oglesby et al.

[11] Patent Number: 5,114,698

[45] Date of Patent: May 19, 1992

[54] METHOD FOR STABILIZING SODIUM DITHIONITE

[75] Inventors: Donald M. Oglesby; George E. Wells, IV, both of Virginia Beach, Va.

[73] Assignee: Hoechst Celanese Corporation, Somerville, N.J.

[21] Appl. No.: 567,836

[22] Filed: Aug. 15, 1990

[51] Int. Cl.⁵ .................. C01B 17/66; B01D 19/00; C09K 3/00

[52] U.S. Cl. ........................ 423/515; 423/265; 252/188.24

[58] Field of Search ............. 423/516, 515, 266, 267, 423/265; 252/188.22, 188.23, 188.24

[56] References Cited

U.S. PATENT DOCUMENTS

| | | | |
|---|---|---|---|
| 3,054,658 | 9/1962 | Franklin et al. | 23/16 |
| 3,287,276 | 11/1966 | Poschmann et al. | 423/515 |
| 3,353,909 | 11/1967 | Janson et al. | 423/515 |
| 3,666,400 | 5/1972 | Lofton et al. | 8/115.6 |
| 3,794,738 | 2/1974 | Ellis et al. | 423/515 |
| 3,839,217 | 10/1974 | Owen et al. | 423/515 |
| 3,856,696 | 12/1974 | Stanbank et al. | 252/188 |
| 3,923,960 | 12/1975 | Leigh | 423/515 |
| 3,960,649 | 6/1976 | Sullivan | 423/515 |
| 4,108,960 | 8/1978 | Leigh | 423/265 |

FOREIGN PATENT DOCUMENTS

| | | | |
|---|---|---|---|
| 2107959 | 8/1972 | Fed. Rep. of Germany | 423/515 |
| 24774 | 10/1968 | Japan. | |
| 16659 | 5/1971 | Japan. | |
| 38408 | 11/1971 | Japan. | |
| 71391 | 9/1973 | Japan. | |
| 22197 | 8/1979 | Japan. | |
| 55-71605 | 5/1980 | Japan | 423/515 |
| 20199 | of 1909 | United Kingdom | 423/515 |
| 1061449 | 3/1967 | United Kingdom. | |
| 1259121 | 1/1972 | United Kingdom. | |
| 1262560 | 2/1972 | United Kingdom. | |
| 1287699 | 9/1972 | United Kingdom. | |
| 1374029 | 11/1974 | United Kingdom. | |
| 1415837 | 11/1975 | United Kingdom. | |
| 1448208 | 9/1976 | United Kingdom. | |
| 1469234 | 4/1977 | United Kingdom. | |

Primary Examiner—Gary P. Straub
Attorney, Agent, or Firm—Rosemary M. Miano

[57] ABSTRACT

A method of stabilizing sodium dithionite is disclosed which comprises exposing a quantity of sodium dithionite to a quantity of amino material under pressure, wherein the partial pressure of amino material is at least 0.5 atmospheres.

8 Claims, 4 Drawing Sheets

METHOD FOR STABILIZING SODIUM DITHIONITE

BACKGROUND OF THE INVENTION

United Kingdom Patent Number 1 259 121 to Leigh discloses non-ionic, cationic and amphoteric materials known generally as surfactants such as detergents, dispersants and emulsifiers as stabilizers for sodium dithionite.

United Kingdom Patent Number 262 560 to Mitsubishi discloses an amine or quaternary ammonium salt which has at least one hydrocarbon group of five or more carbon atoms.

U.S. Pat. No. 3,794,738 to Ellis et al discloses alkali metal or ammonium salts of diglycolic acid as stabilizers of sodium dithionite to retard the selfignition of sodium dithionite when contacted with moisture and/or water.

United Kingdom Patent Number 1 374 029 to BASF discloses compositions having components of a) from 60% to 95% of commercial sodium dithionite (inclusive of impurities); b) from 2.5% to 37.5% of anhydrous sodium carbonate; and c) from 2.5% to 37.5% of pentasodium diethylene triaminopenta-acetate as stabilized formulations of sodium dithionite.

U.S. Pat. No. 3,923,960 to Leigh discloses an anhydrous dithionite composition rendered resistant to ignition by including in it as a stabilizer a carboxylic acid salt of a primary, secondary or tertiary amine having at least one hydrocarbon group of at least five carbon atoms.

SUMMARY AND OBJECT OF THE INVENTION

This invention comprises exposing, such as by mixing, a quantity of sodium dithionite, such as commercial grade sodium dithionite, to a quantity of amino material selected from (1) ammonia in a liquid or gaseous form; (2) an amine in a liquid or gaseous form, formed by substitution of one or more of the hydrogens of the ammonia molecule; and (3) any solid, liquid or gaseous material serving as a source of the material described in (1) or (2), wherein the exposure takes place at a temperature lower than the decomposition temperature of the sodium dithionite, such that the partial pressure of the ammonia or amine is at least 0.5 atmosphere when the decomposition begins to occur. This mixture of the sodium dithionite and amino material is advantageously stored in a closed container designed to accommodate an internal pressure of at least 3.0 atmospheres as measured by gauge pressure.

The object of this invention is to stabilize commercial grade sodium dithionite so that it is less likely to burn if the temperature becomes elevated during storage. It is also an object of this invention to improve the stability of sodium dithionite, especially commercial grades of this material, in a manner which makes it less likely to undergo rapid exothermic decomposition when exposed to moisture.

DETAILED DESCRIPTION OF THE INVENTION

Figure 1:
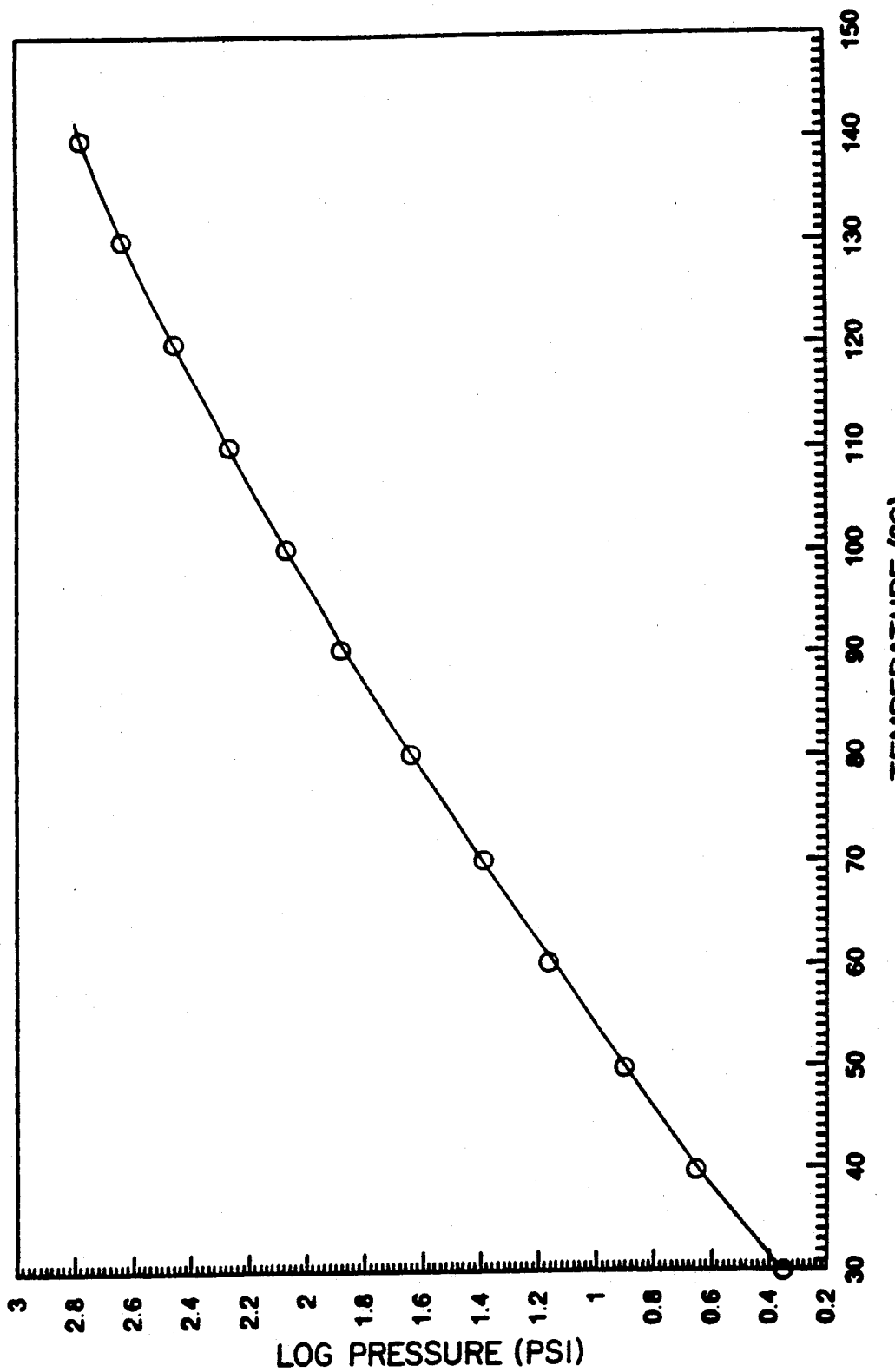
FIG. 1 shows the equilibrium partial pressure of $NH_3$ from ammonium carbamate versus temperature.

It has been discovered that the addition of an amino material to a container of sodium dithionite increases the thermal stability of the sodium dithionite. Amino material is defined as one or more members selected from the group consisting of (1) ammonia in a liquid or gaseous form; (2) an amine in a liquid or gaseous form, formed by substitution of one or more of the hydrogens of the ammonia molecule; and (3) any solid, liquid or gaseous material serving as a source of the material described in (1) or (2), wherein the amino material is capable of creating the desired partial pressure at a temperature lower (and especially near) that at which decomposition of sodium dithionite normally begins to occur. This increase in thermal stability is exhibited, for example, by a rise in the temperature at which thermal decomposition begins by as much as 30 degrees C. While the exact mechanism for this phenomenon is not known, it is believed that ammonia and amines are vigorous proton scavengers and, especially as gases, are able to uniformly distribute themselves throughout the void space in the container of sodium dithionite and quickly react with any available protons. While the use of ammonia gas may be preferred, in that fewer by-products may be formed, it is also within the spirit and scope of this invention to use a solid or liquid compound which releases ammonia gas or a gaseous amine under suitable conditions.

Partial pressure may be defined as (1) the fraction of the total pressure due to each constituent of a gas mixture; or (2) the pressure due to one of the several components of a gaseous or vapor mixture.

The use of a solid or liquid compound which releases ammonia gas or a gaseous amine when heated represents a convenient way to supply ammonia gas or a gaseous amine when its proton-scavenging function is most needed, i.e., when the temperature is elevated and the risk of run-away thermal decomposition is greatest. Ammonium carbamate is an example of a solid amino material which produces the desired effect. Diisopropylamine, n-butylamine, triethylamine and N,N-dimethyl-n-butylamine are examples of liquid amino materials which may be used. Methylamine is an example of a gas other than ammonia which may be used. Compatible mixtures of gases, liquids and solids may also be used in combination.

Stabilization of sodium dithionite is achieved by placing a quantity of sodium dithionite into a pressurizable container, such as one constructed from stainless steel, and introducing into the container an amount of amino material sufficient to produce a partial pressure of ammonia or gaseous amine between 0.5 and 3.0 atmospheres (as measured on either a gauge or an absolute scale) when the container is sealed and the temperature reaches the point at which exothermic decomposition begins (usually between 60 and 90 degrees C.). It is believed that concentrations of amino materials which produce partial pressures of ammonia or gaseous amine less than 0.5 atmosphere are not effective and that concentrations of amino materials which produce partial pressures of ammonia or gaseous amine greater than 3.0 atmospheres are not necessary. It is believed that for optimum effect the partial pressure of the amino material should be about 2.0 atmospheres when thermal decomposition of the sodium dithionite begins. In the case of the solid amino material ammonium carbamate the optimum concentration is approximately 1.5% by weight. However, this will depend on the void volume in the container. There must be sufficient amino material to produce a partial pressure of 0.5-3.0 atmospheres of gaseous amino material in the headspace of the container at the temperature at which decomposition of sodium dithionite begins. If the container is only partially filled with sodium dithionite, more amino material will be required. For example, solid ammonium carbamate is in equilibrium with ammonia and carbon dioxide in accordance with the following equation:

$$NH_2CO_2NH_4 \rightleftharpoons 2NH_3 + CO_2$$

Figure 2:
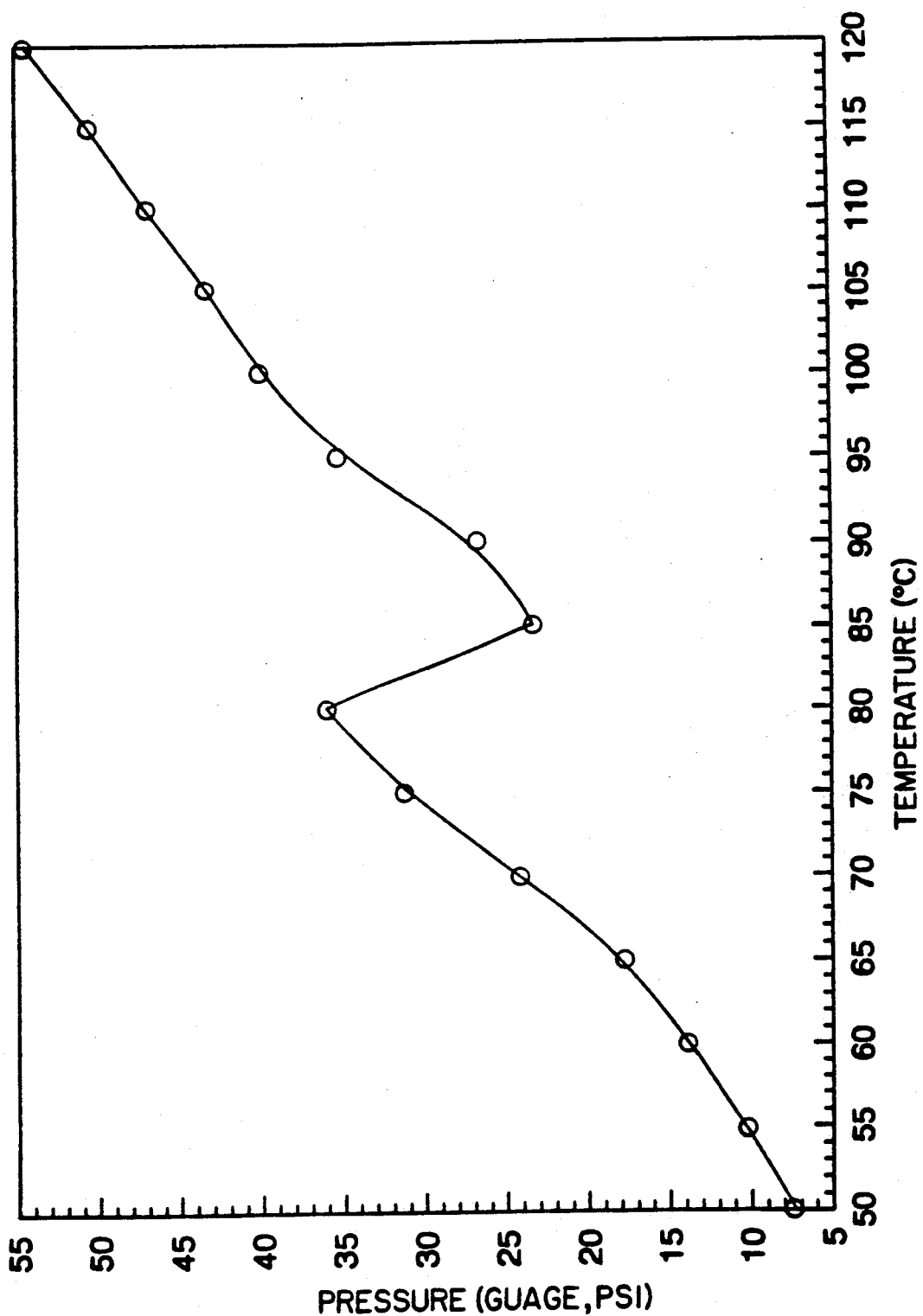
FIG. 2 shows the pressure of the headspace gasses for 90% sodium dithionite and 1.5% ammonium carbamate.

For this reaction the relationship between temperature and ammonia pressure is shown as in FIG. 1, Equilibrium Partial Pressure of $NH_3$ From Ammonium Carbamate Versus Temperature. In order for the partial pressure of ammonia from ammonium carbamate to be 1.0 atmosphere at 80° C., there must be at least 2.7 grams of ammonium carbamate per liter of void volume in the container of sodium dithionite. However, it has been found that approximately three times this amount (or about 8 grams) of ammonium carbamate per liter of void volume is actually required. This is due to the fact that some of the ammonia generated by the ammonium carbamate is consumed by chemical reaction. FIG. 2, Pressure of the Headspace Gases Versus Temperature for 90% Sodium Dithionite and 1.5% Ammonium Carbamate, shows the pressure versus temperature curve for a sample of sodium dithionite containing 1.5% ammonium carbamate. It is believed that the drop in pressure which occurs at about 80° C. is due to the reaction of ammonia with sulfur dioxide produced when decomposition begins. Further, it is believed that this reaction of ammonia with the sulfur dioxide delays the onset of the major exothermic decomposition of sodium dithionite by decreasing the availability of catalytic protons by the following reaction:

$$2 NH_3 + SO_2 + H_2O \rightarrow (NH_4)_2SO_3$$

While it may be convenient to use one amino material at a time as an additive, it is also within the spirit and scope of the invention to use more than one amino material. For example, one may choose to use a selection of additives that would each release ammonia gas or a gaseous amine at a variety of temperatures.

The degree to which the invention improves the stability of sodium dithionite may be measured by determining the temperature at which self-heating (exothermic decomposition) begins under adiabatic conditions. Adiabatic conditions represent the worst-case situation in the storage and shipping of metal dithionites, since these are the conditions under which there is no cooling if the material begins exothermic decomposition.

Samples of sodium dithionite may be treated with various partial pressures of ammonia, gaseous amines or various concentrations of solid or liquid materials meeting the criteria described herein. After treatment, the sodium dithionite must be maintained in a container in which a partial pressure of at least 0.5 atmospheres for the amino material is maintained until the sodium dithionite is used.

EXAMPLES

The following examples are illustrative of the invention.

EXAMPLE 1

Figure 3:
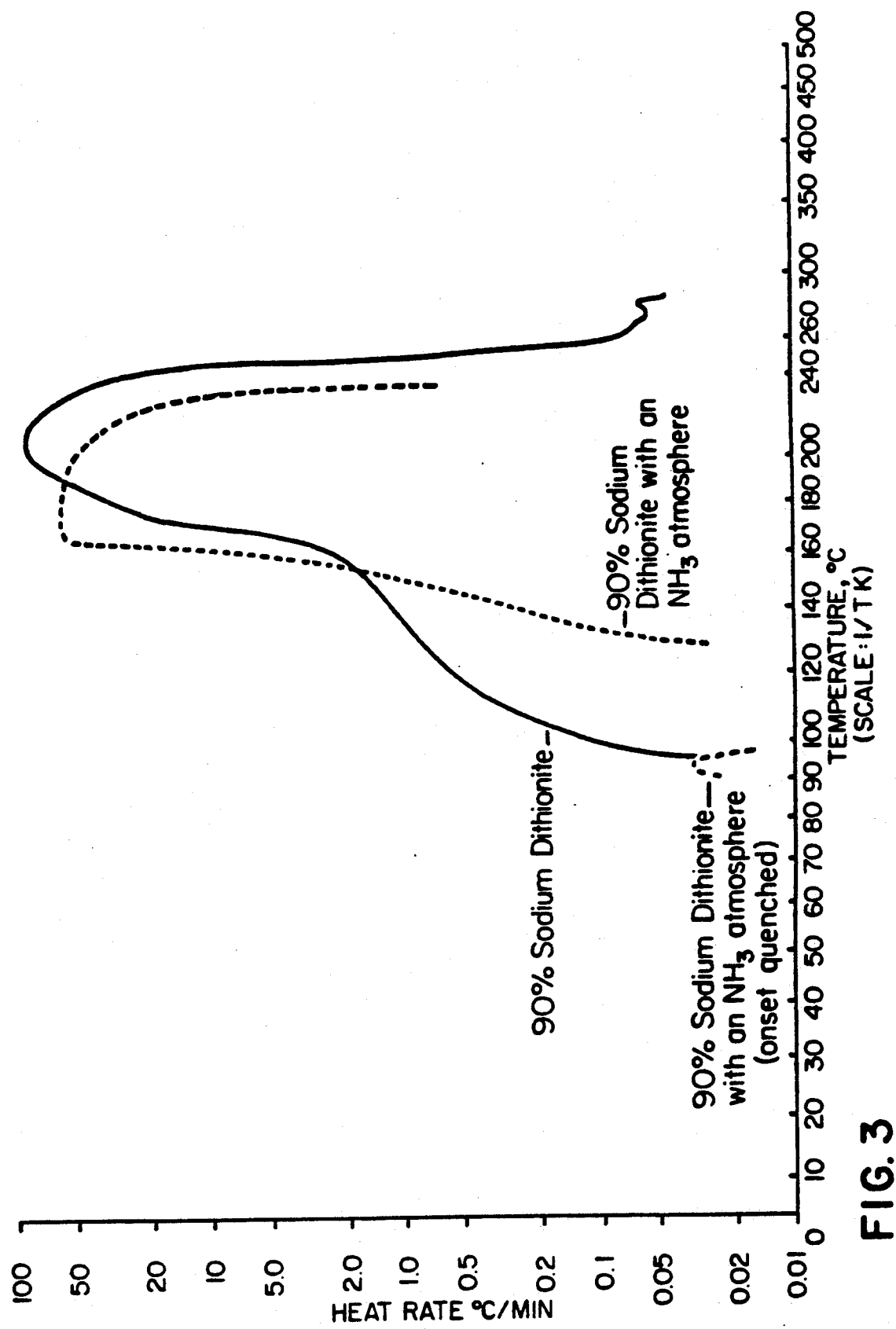
FIG. 3 shows a comparison between the ARC self-heat rate curve for 90% sodium dithionite with and without an $NH_3$ atmosphere.

A 3.84 sample of 92% sodium dithionite is placed in a 1 inch diameter titanium sample container designed for an accelerating rate calorimeter (ARC) (Columbia Scientific Industries, Austin, Tex.). The sample container is attached to the line in the ARC leading to the pressure transducer. A tee in the line between the pressure transducer and the sample container is valved and plumbed to a vacuum pump. The air in the sample container is removed by means of the vacuum pump down to an absolute pressure of approximately 35 torr and the sample container is then filled with ammonia gas until the absolute pressure is about 3.3 atmospheres. The tee valve is then closed, sealing the sample container in the calorimeter. The ARC is programmed to raise the calorimeter temperature in 5° C. increments and record heat rate versus temperature once exothermic decomposition is detected. The ARC is programmed to produce a plot of heat rate in °C./min (logarithmic scale) versus temperature in °C. (logarithmic scale). The temperature at which self-sustained thermal decomposition occurs is approximately 36 degrees higher than that for the same sodium dithionite under nitrogen, as measured by use of the ARC. FIG. 3, A Comparison Between the ARC Self-Heat Rate Curve for Sodium Dithionite With and Without an $NH_3$ Atmosphere, shows a comparison of the heat rate versus temperature for 90% sodium dithionite and 90% sodium dithionite treated with $NH_3$.

EXAMPLE 2

Figure 4:
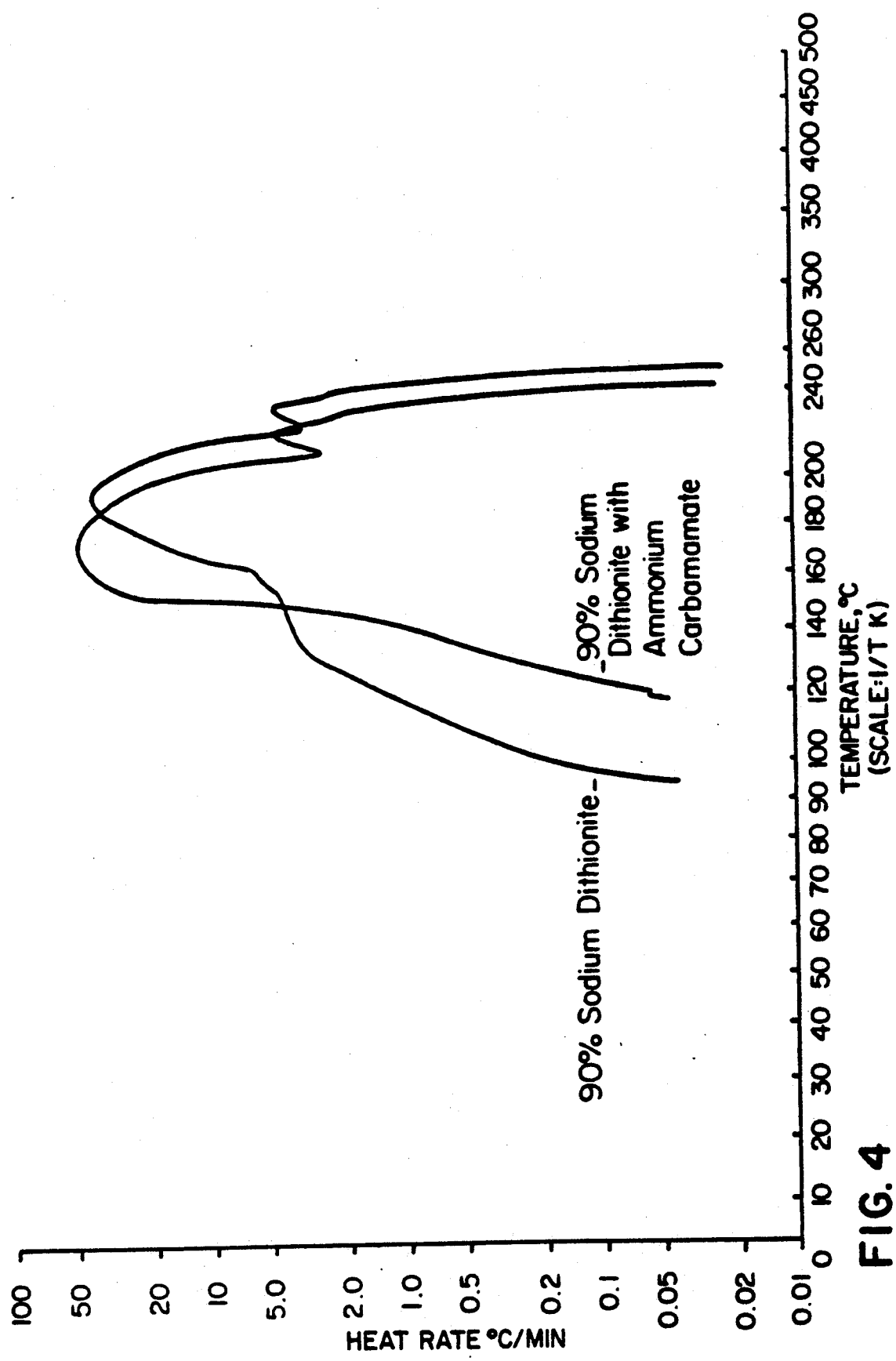
FIG. 4 shows a comparasion between the ARC self-heat rate curve for 90% sodium dithionite with and without ammonium carbamate.

A 4.27 g sample of 90% sodium dithionite is blended with 0.0570 g of ammonium carbamate, $NH_2CO_2NH_4$, to cause the final mixture to be 1.5% ammonium carbamate by weight. The mixture is then placed in a 1 inch diameter titanium sample container designed for an accelerating rate calorimeter (ARC). The container is attached to the line leading to the pressure transducer, thereby sealing it. The ARC is programmed to raise the temperature in 5.C increments and to record heat rate versus temperature once exothermic decomposition is detected. The sodium dithionite treated with 1.3% ammonium carbamate begins self-sustained thermal decomposition at a temperature approximately 23.C higher than the same untreated sodium dithionite. FIG. 4, A Comparison Between the ARC Self-Heat Rate Curve for 90% Sodium Dithionite With and Without Ammonium Carbamate, shows a comparison of the heat rate versus temperature for 90% sodium dithionite and 90% sodium dithionite containing ammonium carbamate.

EXAMPLES 3-8

Examples 3-8 are conducted by the same method as described in Example 2, but are done by using the concentrations indicated in TABLE 1. The resulting elevations in the temperature at which self-sustained decomposition begins are also indicated in TABLE 1.

EXAMPLE 9

Example 9 is conducted by the same method as described in Example but is done by using the pressure indicated in TABLE 1. The resulting elevation in the temperature at which self-sustained decomposition begins is indicated in TABLE 1.

EXAMPLE 10

A 3.746 g sample of 90% sodium dithionite is placed in a 1 inch diameter titanium sample container designed for an accelerating rate calorimeter (ARC). The sample container is attached to the line in the ARC leading to the pressure transducer and the calorimeter is closed with the sample container inside. A tee in the line between the pressure transducer and the sample container is valved and plumbed to a vacuum pump. The air in the sample container is removed by means of the vacuum pump down to an absolute pressure of approximately 35 torr and the sample container is then filled with methylamine until the absolute pressure is about 3.3 atmospheres. The tee valve is then closed, sealing the sample container in the calorimeter. The ARC is programmed to raise the temperature in 5° C. increments and to record the heat rate versus temperature once exothermic decomposition is detected. The sodium dithionite treated with methylamine begins selfsustained thermal decomposition at a temperature 14° C. higher than the same untreated sodium dithionite.

TABLE 1
STABILIZATION OF SODIUM DITHIONITE AGAINST THERMAL DECOMPOSITION

| Example | Additive | Concentration | Base Response[1] | Response w/Additive[2] | ΔT |
|---|---|---|---|---|---|
| 1 | $NH_3$ | 3.3 atm. | 96° C. | 130° C. | 34° C. |
| 2 | $NH_2CO_2NH_4$* | 1.3% | 78° C. | 105° C. | 27° C. |
| 3 | " | 0.7% | 81° C. | 91° C. | 10° C. |
| 4 | " | 1.0% | 94° C. | 114° C. | 20° C. |
| 5 | " | 1.2% | 99° C. | 120° C. | 21° C. |
| 6 | " | 1.9% | 77° C. | 100° C. | 23° C. |
| 7 | " | 2.2% | 94° C. | 122° C. | 28° C. |
| 8 | " | 3.4% | 72° C. | 98° C. | 26° C. |
| 9 | $NH_3$ | 1.1 atm. | 96° C. | 122° C. | 26° C. |
| 10 | Methylamine | 3.3 atm. | 101° C. | 115° C. | 14° C. |

[1]Temperature at which self-sustained decomposition begins without any additive.
[2]Temperature at which self-sustained decomposition begins with an additive.

What is claimed:

1. A method of stabilizing sodium dithionite to increase the temperature at which thermal decomposition begins, wherein said method comprises selecting a container, adding to said container at about atmospheric pressure a quantity of sodium dithionite and a quantity of an amino material selected from the group consisting of liquids and solids capable of releasing ammonia gas at or near the temperature at which sodium dithionite begins to decompose, and sealing said container, wherein said quantity of said amino material is selected so that the partial pressure of ammonia gas created at a temperature where sodium dithionite begins to decompose is at least 0.5 atmospheres.

2. A method as claimed in claim 1, wherein said partial pressure is between 0.5 and 3 atmospheres.

3. A method as claimed in claim 1, wherein said amino material is a liquid at ambient temperature.

4. A method as claimed in claim 3, wherein said liquid is selected from the group consisting of diisopropylamine, n-butylamine, triethylamine and N,N-dimethyl-n-butylamine.

5. A method as claimed in claim 1, wherein said amino material is a solid at ambient temperature.

6. A method as claimed in claim 5, wherein said solid is ammonium carbamate.

7. A method as claimed in claim 1 in which said amino material is selected from a group consisting of at least two different amino materials.

8. The method as claimed in claim 1, wherein said partial pressure is at least 2 atmospheres.

* * * * *